United States Patent
Lu et al.

(10) Patent No.: US 12,206,650 B2
(45) Date of Patent: Jan. 21, 2025

(54) DATA TRANSFER WORKFLOW IN A MULTI-MACHINE ECOSYSTEM

(71) Applicant: International Business Machines Corporation, Armonk, NY (US)

(72) Inventors: Fang Lu, Billerica, MA (US); Tushar Agrawal, West Fargo, ND (US); Jeremy R. Fox, Georgetown, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

(21) Appl. No.: 17/935,952

(22) Filed: Sep. 28, 2022

(65) Prior Publication Data
US 2024/0106804 A1 Mar. 28, 2024

(51) Int. Cl.
*H04L 9/40* (2022.01)

(52) U.S. Cl.
CPC .............. *H04L 63/0428* (2013.01)

(58) Field of Classification Search
CPC .................................. H04L 63/0428
See application file for complete search history.

(56) References Cited

U.S. PATENT DOCUMENTS

| | | | |
|---|---|---|---|
| 9,826,415 B1* | 11/2017 | Byrne | G08B 25/14 |
| 10,630,591 B2 | 4/2020 | Fredette | |
| 2012/0237028 A1* | 9/2012 | Khazan | G05D 1/0022 |
| | | | 380/258 |
| 2014/0316616 A1* | 10/2014 | Kugelmass | G06T 11/206 |
| | | | 701/8 |
| 2016/0144959 A1 | 5/2016 | Meffert | |
| 2017/0270314 A1 | 9/2017 | Tsybrovskyy | |
| 2018/0046181 A1* | 2/2018 | Lai | H04W 4/023 |
| 2018/0222582 A1* | 8/2018 | Ohata | G06T 1/0007 |
| 2019/0215179 A1 | 7/2019 | Mannfeld | |
| 2020/0043342 A1 | 2/2020 | Cunningham | |

(Continued)

FOREIGN PATENT DOCUMENTS

| | | |
|---|---|---|
| JP | 4031796 B2 | 1/2008 |
| JP | 6511551 B2 | 5/2019 |
| KR | 20150129601 A | 11/2015 |

OTHER PUBLICATIONS

"Patent Cooperation Treaty PCT Notification of Transmittal of the International Search Report and the Written Opinion of the International Searching, Authority, or the Declaration", International application No. PCT/IB2023/058783, International filing date Sep. 5, 2023, Date of mailing Nov. 7, 2023, 13 pages.

(Continued)

*Primary Examiner* — Raqiul A Choudhury
(74) *Attorney, Agent, or Firm* — Elliot J. Shine

(57) ABSTRACT

Facilitating transfer of data from a first machine and/or computing system to at least a second machine and/or computing system in instances where traditional data transfer methods (such as using a communications network) are not immediately feasible is achieved by identifying a triggering event for physical transport of data, collecting the data to be transported, and transferring the data. Secure transfer of the collected data is achieved via encryption of the collected data.

20 Claims, 3 Drawing Sheets

(56) References Cited

U.S. PATENT DOCUMENTS

2021/0076158 A1    3/2021  Frusina
2023/0177888 A1*   6/2023  Salter .................... B60W 50/10

OTHER PUBLICATIONS

Liu et al., "SCMP-V: A secure multiple relays cooperative downloading scheme with privacy preservation in VANETs", Peer-to-Peer Networking and Applications (2022), Published onlne: Oct. 6, 2021, 15 pages.

Lu et al., "UAV-Aided Cellular Communications with Deep Reinforcement Learning Against Jamming", arXiv:1805.06628v2 [eess.SP] Apr. 23, 2019, 6 pages.

Mah et al., "Secrecy improvement via joint optimization of UAV relay flight path and transmit power", Vehicular Communications 23 (2020), Available online Dec. 12, 2019, © 2019 Elsevier Inc., 13 pages.

Wang et al., "Physical Layer Security for UAV Communications in 5G and Beyond Networks", arXiv:2105.11332v1 [cs.NI] May 24, 2021, 27 pages.

"ICO Robotics—Robotics@IBM", 2022 Initiatives Robotics Services, 4 pages, <https://w3.ibm.com/w3publisher/ico-robotics>.

Deaconu et al., "Algorithms for Delivery of Data by Drones in an Isolated Area Divided into Squares", Sensors 2021, 21, 5472, Published: Aug. 13, 2021, 19 pages, <https://www.mdpi.com/journal/sensors>.

Disclosed Anonymously, "Dynamic Positioning of Mobile Drone Towers", An IP.com Prior Art Database Technical Disclosure, IP.com No. IPCOM000267213D, IP.com Electronic Publication Date: Oct. 4, 2021, 5 pages.

Disclosed Anonymously, "Information transfer between vehicles by using drones", An IP.com Prior Art Database Technical Disclosure, IP.com No. IPCOM000247589D, IP.com Electronic Publication Date: Sep. 19, 2016, 2 pages.

Disclosed Anonymously, "Method and System for Facilitating Data Transfer Using Unmanned Aerial Vehicles (UAVs)", An IP.com Prior Art Database Technical Disclosure, IP.com No. IPCOM000256624D, IP.com Electronic Publication Date: Dec. 17, 2018, 3 pages.

Disclosed Anonymously, "Storage Area Network Relocation Utilizing Drones", An IP.com Prior Art Database Technical Disclosure, IP.com No. IPCOM000242096D, IP.com Electronic Publication Date: Jun. 18, 2015, 3 pages.

Ojetunde et al., "A Practical Approach to Deploying a Drone-Based Message Ferry in a Disaster Situation", applied sciences, MDPI, Published: Jun. 28, 2022, Appl. Sci. 2022, 12, 6547, 15 pages.

Ulz et al., "Sneakernet on Wheels: Trustworthy NFC-based Robot to Machine Communication", printed on Aug. 24, 2022, 6 pages, <https://pure.tugraz.at/ws/portalfiles/portal/12221257/R2M_Camera_Ready.pdf>.

YouTube, "Meet Spot, the Trusted Tool for Industrial Inspection |Boston Dynamics", Jan. 4, 2021, 2 pages, <https://www.youtube.com/watch?v=vQBEwPEBMOs&feature=youtube>.

YouTube, "Spot Launch—Youtube", 2020, 4 pages, <https://www.youtube.com/watch?reload=9&v=wlkCQXHEgjA>.

\* cited by examiner

DATA TRANSFER WORKFLOW IN A MULTI-MACHINE ECOSYSTEM

BACKGROUND

The present invention generally relates to the field of data transfer, and more specifically to utilizing methods of data transfer between machines in a particularized environment.

SUMMARY

According to an aspect of the present invention, there is a method, computer program product and/or system that performs the following operations (not necessarily in the following order): (i) providing a plurality of data transfer vehicles, with each data transfer vehicle of the plurality of data transfer vehicles being structured and configured to transfer encrypted data from a first machine to a second machine; (ii) positioning, in a proactive manner, the plurality of data transfer vehicles around the first machine and the second machine so that a data transfer operation can be performed in an efficient manner; (iii) determining that a first condition exists that prevents the first machine from performing a data transfer operation to the second machine; (iv) responsive to the determination that the first machine cannot perform the data transfer operation to the second machine, collecting, by the first data transfer vehicle, a set of encrypted data stored on the first machine; and (v) transferring, by the first data transfer vehicle, the set of encrypted data stored on the first machine to the second machine.

According to an aspect of the present invention, there is a method, computer program product and/or system that performs the following operations (not necessarily in the following order): (i) tracking a set of machines for whether each machine is able to communicate with each other and execute a machine-to-machine workflow; (ii) learning from historical poor network events and how each machine reacts during respective historical poor network events to track how each machine was impacted based on a type of network issues and duration of an event to predict when to deploy respective data transfer vehicles of a set of data transfer vehicles, wherein an optimum movement path of the set of data transfer vehicles is created; (iii) responsive to determining a first machine cannot perform a data transfer to a second machine due to a network connectivity problem, instructing the data transfer vehicle to collect data from the first machine, physically travel to the second machine, and perform the data transfer of the data to the second machine enabling the machine-to-machine workflow; (iv) proactively positioning the data transfer vehicle around a data generation source based on generated data volume and need of data transfer; and (v) during the data transfer, receiving encrypted data from the first machine and a public key that the second machine having a private key.

DETAILED DESCRIPTION

Figure 1:
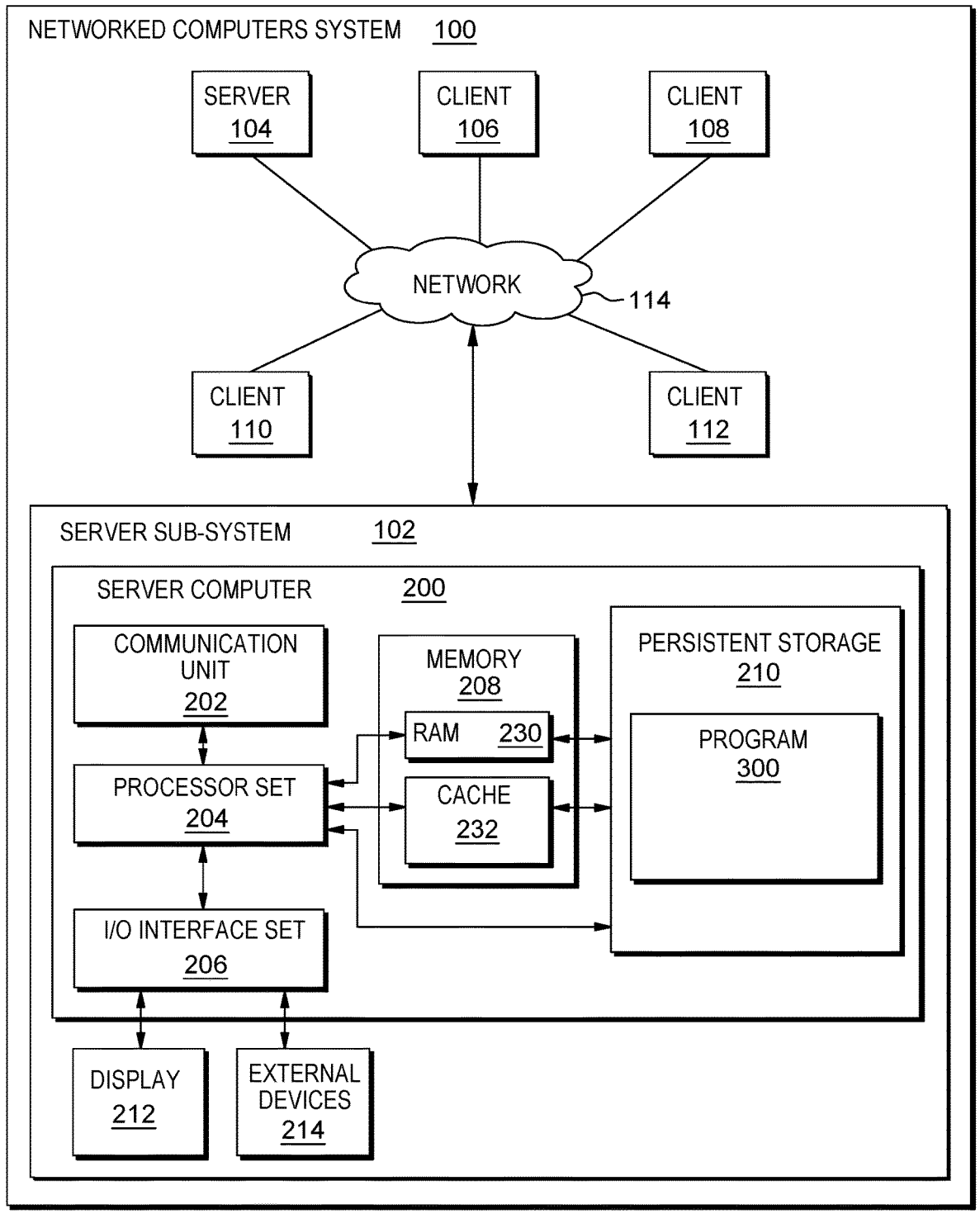
FIG. 1 is a block diagram view of a first embodiment of a system according to the present invention.

Facilitating transfer of data from a first machine and/or computing system to at least a second machine and/or computing system in instances where traditional data transfer methods (such as using a communications network) are not immediately feasible is achieved by identifying a triggering event for physical transport of data, collecting the data to be transported, and transferring the data. Secure transfer of the collected data is achieved via encryption of the collected data. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
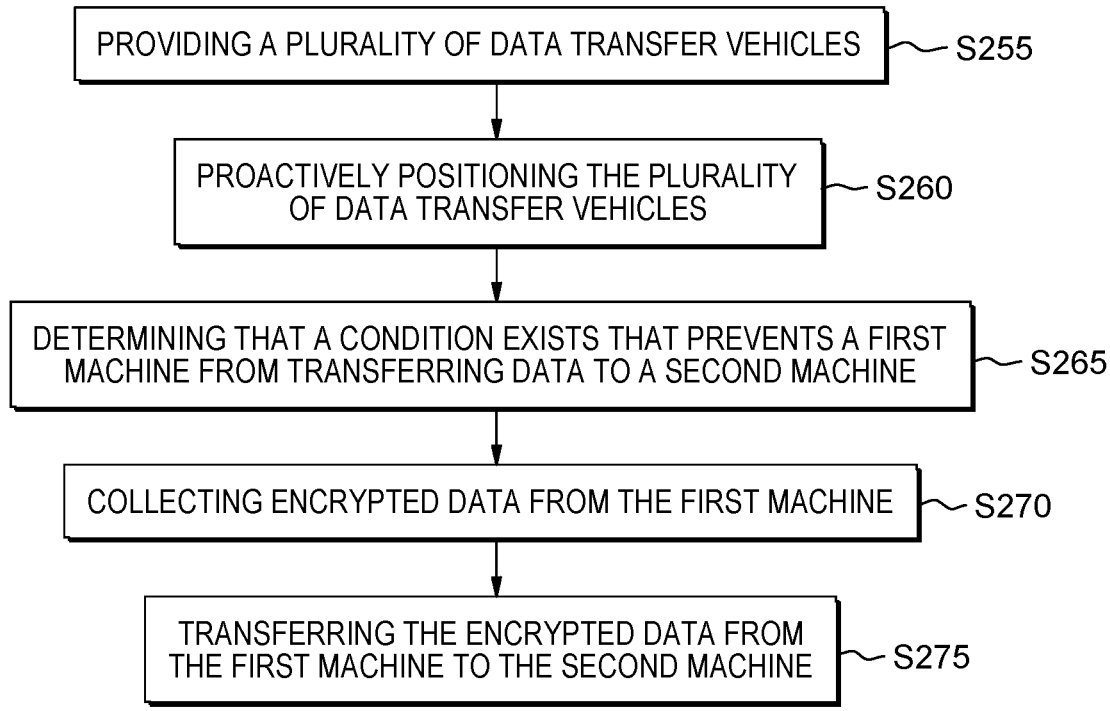
FIG. 2 is a flowchart showing a first embodiment method performed, at least in part, by the first embodiment system.
Figure 3:
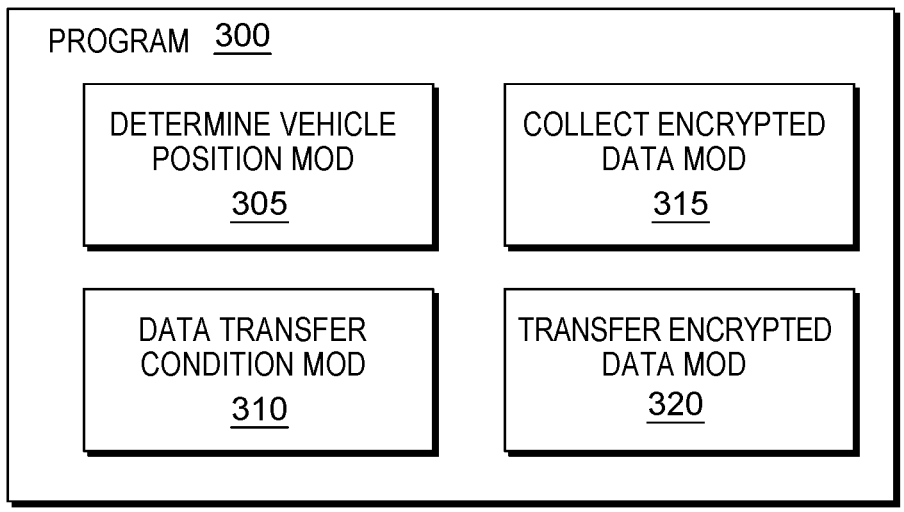
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation 5255, where a plurality of data transfer vehicles are provided. In some embodiments of the present invention, the data transfer vehicles are structured and configured to be sufficiently mobile in a series of potentially unstable environments (such as environments affected by natural disasters). In some embodiments, data transfer vehicles can include drones and/or automated robotic machines that are designed to traverse uneven terrain (such as a geographic region that is affected by an earthquake).

Processing proceeds to operation 5260, where determine vehicle position module ("mod") 305 proactively positions the plurality of data transfer vehicles near the first machine and the second machine. In some embodiments of the present invention, in order to ensure that any transfer of data between machines is performed efficiently and effectively, mod 305 determines the optimal distribution and placement of the data transfer vehicles in a given environment. In certain disaster recovery regions, it is essential that the data transfer vehicles can quickly access certain time-sensitive data that is stored on machines that are unable to transfer this data.

Processing proceeds to operation 5265, where data transfer condition mod 310 determines that a condition exists that prevents the first machine from transferring data to a second machine. In some embodiments of the present invention, the condition is one in which the data transfer capability of the machines is impracticable or impossible. For example, in one instance, this condition can be as simple as the first machine being outside of a near-field communication (NFC) range of the second vehicle, but the terrain in which the first machine is located cannot be easily traversed due to a natural disaster (or other less impactful event). In another instance, the condition can be that the network connectivity in a given region is inoperable due to the natural disaster event.

Processing proceeds to operation 5270, where collect encrypted data mod 315 collects encrypted data from the first machine. Processing finally proceeds to operation 5275, where transfer encrypted data mod 320 transfers the collected encrypted data (discussed in connection with operation 5270, above) from the first machine to the second machine.

III. Further Comments and/or Embodiments

To initiate machine to machine communication, there typically needs to be a communications protocol such as Bluetooth, Wi-Fi, Near-field Communication, etc. In this instance, the machines with communications protocols can include vehicle(s) and/or other automated machines. To perform activities in a collaborative manner, the machines communicate with each other. If the distance between the machines is more than a threshold limit, then the machine-to-machine data transfer will not be possible in a poor network environment and data transfer will also be difficult.

In various circumstances where there may not be any Wi-Fi communication, or internet connection may not be available, at the same time, the machines that need to communicate with each other may be placed beyond the Bluetooth range. In this scenario, the machines will not be able to communicate with each other to perform a given activity in a collaborative manner.

Embodiments of the present invention provide the following advantages, features, and/or characteristics:

(1) Physical Device Data Transfer (device to device). In any multi-machine ecosystem, if any machines and/or other data source(s) are not able to transfer data to another machine and/or computing system due to network connectivity problems for any reason (for example, beyond the range, Wi-Fi unavailability, etc.), then some embodiments of the present invention use a physical data transfer vehicle to transfer data and information from one machine and/or computing system to another machine and/or computing system to perform the machine to machine workflow(s).

(2) Send physical device to predicted and/or projected data point. Based on generated data volume from any machine and/or computing system and the need of transferring the data to another machine and/or computing system, the data transfer vehicle will, according to some embodiments, be proactively positioned nearby the data generation source to collect the needed data and transfer the collected data to the data transfer vehicle. This way, the data transfer vehicle can transmit the needed data to the target machine and/or computing system.

(3) Data Encryption. According to some embodiments of the present invention, the sending machine and/or system encrypts the needed data and assigns a public key to it. Additionally, the target machine and/or computing system receives a private key for the encrypted data validation prior to transfer of the needed data from the data transfer vehicle.

(4) Collection Device for Projected Data Interactions. According to some embodiments of the present invention, the data transfer vehicles move about the pre-defined boundary to interact with different machines and/or systems of the multi-machine ecosystem and identify which machine or system is generating needed data, to which machine the needed data is to be transferred, and/or how much time is required to transfer the needed data from generating machine to target machine.

Some embodiments of the present invention are directed to operation of data transfer vehicles within a pre-defined boundary that includes machines within a multi-machine ecosystem. According to some embodiments of the present invention, for any given data transfer vehicle, the surrounding area is limited to a pre-defined distance from another data transfer vehicle. The pre-defined distance may be the communication range of a specified active communication channel. Where there are more than two data transfer vehicles, the surrounding area may be defined by the limitations in communication ranges of each of the included data transfer vehicles such that a boundary of the surrounding may take one a variety of shapes so long as each data transfer vehicle is within a communication range of at least one other data transfer vehicle. By assuring communication distances are maintain, the possibility of a collaborated data transfer activity is possible.

(5) Predicted Intelligent Workflow of Machines and/or Devices in Scope. Some embodiments of the present invention are directed to tracking whether the machines and/or computing systems are able to communicate with each other to execute a given workflow. In some embodiments of the present invention, if the proposed system identifies that there is a network problem, then a data transfer vehicle is activated to initiate a data transfer from a source machine to a target machine.

(6) Risk of Network Loss or Machine Failure given Device Tasking. Some embodiments of the present invention are directed to learning, based on the historical poor network events and how target machines/systems are reached in such conditions. Accordingly, some embodiments of the present invention are directed to tracking which machines and/or systems were impacted based on a type of network issue and a duration of the event in order to predict a need for alternative data transfer and to deploy a data transfer vehicle to a specified source computer.

(7) Multiple Data Transferring Devices. In a given pre-defined boundary, there can be multiple data transfer vehicles, so that the data transfer vehicles can collaborate with each other and create an optimized movement path that creates possible movements for the data to be transferred in the shortest possible time. Some embodiments of the present invention are directed to handing off collected data for transfer over a distance beyond a reference distance in which data transfer vehicles may communicate, such as beyond the connectivity range of a given Wi-Fi network. By collaborating among data transfer vehicles, a series of data transfer vehicles, operating within the bounds of respectively corresponding Wi-Fi networks, or other communication channel boundaries, transfer collected data from one machine to another machine at greater distances than if limited to a particular communication range. The scenario of a great distance to transfer collected data is likely under a circumstance where a preferred communication channel is inoperable and collected data must be transmitted from a data collection point, or computing device, to another computing device.

(8) Device Communications Priority. Some embodiments of the present invention consider an assigned priority of the data communication in order to deploy the data transfer vehicles when more than one computing device is not able to communicate over the network. This is done to ensure that a proper process is completed in a sequential manner that is required for the underlying process instead of a simplified first-in first-out (FIFO) process.

(9) Data Transportation for Analysis. Some embodiments of the present invention extend to physically transferring needed data to a centralized station via an edge network or edge node (such as a computing node) so that the needed data can be used for analysis and so that instructions can be received into a particular multi-machine ecosystem.

The following operations provide a step-by-step detailed description of various aspects of the present invention to provide helpful details on how some embodiments of the present invention may be utilized:

(1) SETUP—Some embodiments of the present invention are deployed when machine-to-machine communication is required for performance of a particular task. In any multi-machine and/or computing system environment, while computing and/or other activities requiring a communications network are being performed, machine to machine communication may be required.

(2) SETUP—Synchronized Device to Device Workflow. In some embodiments of the present invention, machine-to-machine communication may be required to execute certain tasks in a synchronized manner such that the tasks are performed in a sequential workflow.

(2)(a) According to some embodiments of the present invention, the machines in the ecosystem have a machine to machine communication system by which the machines that are present in a given surrounding and can communicate with one another.

(2)(b) According to some embodiments of the present invention, the system will identify whether machine-to-machine communication is possible or if the communication system is functional in a given surrounding or pre-define region or boundary.

(3) CONTEXT OF ENVIRONMENT. According to some embodiments of the present invention, the system identifies the task being performed in the surrounding area and identifies machine to machine communication as being required to complete the task.

(4) Monitoring of the Surrounding. Some embodiments of the present invention utilize a camera module to scan the surrounding area or pre-defined boundary to identify relative positions of different machines within the multi-machine ecosystem.

(5) Image Analysis. According to some embodiments of the present invention, the image analysis module analyzes images captured by the cameras of the camera module to identify the types of different machines and their relative positions and distances to one another.

(6) Machines performing Unique Tasking—Each machine may have Unique Data Requirements. Each machine performing tasks or sub-tasks identifies the need for sharing certain data or information with other machines within the ecosystem.

(7) Predicted Communications. Some embodiments of the present invention identify whether machine-to-machine communication is feasible in certain circumstances.

(8) Data Transfer Vehicle. Some embodiments of the present invention provide for a data transfer vehicle to transfer needed data from one machine to another machine within a specified multi-machine ecosystem.

(9) Video Feeds for Transfer Vehicle. According to some embodiments of the present invention, the data transfer vehicles have an attached camera module for determining relative positioning of the machines in the surrounding area.

(10) Intelligent Workflow—Identified Requirements for Data Transfer Request. According to some embodiments of the present invention, the multi-machine ecosystem provides for determination of whether any digital communication is to be established between and/or amongst the various machines in order to properly complete the given workflow(s).

(11) Machine Communication Requirements. According to some embodiments of the present invention, each machine signals or otherwise identifies whether a given machine needs to communicate with other machines in the ecosystem.

(12) Data Requirements for Transfer. Some embodiments of the present invention identify what information or set of instructions is to be transferred from one machine to the other machines in the ecosystem.

(13) Video Feed—Identification of Location and Feed Specifications. Based on the information generated from the various camera module(s), the relative position of different machines can be identified.

(14) Dynamic Movement—Continuous Mobile Machines & Devices: The data transfer vehicles in the surrounding move about a pre-defined boundary, communicating with each machine in the boundary or, in some examples, within the entire specified surrounding.

(15) Identification of Machine-to-Machine Data Movement. Some embodiments of the present invention identify whether any machine needs to transfer data to any other system in the ecosystem.

(16) Network Awareness. Some embodiments of the present invention identify if a communications network is available to establish machine-to-machine communication.

(17) Data Transfer Failure—Next Best Movement Pattern. According to some embodiments of the present invention, if communication is determined not to be possible, the data transfer vehicles move within the ecosystem, carrying needed data to facilitate machine-to-machine communication when principle communications channels are down.

(18) Data Movement Device—Moving towards Target Destination. According to some embodiments of the present invention, data transfer vehicles collect data from any machine in the ecosystem and travels towards a target machine where the needed data is to be transferred.

Some embodiments of the present invention include the following characteristics, features and/or advantages: (i) provides a "RISK EVENT"; (ii) utilizes an image analysis module that takes into consideration the vehicles that are typically placed in the environment based on an analysis of the logos that are on the vehicles; (iii) determines an optimal way to conduct data transfer based on the type and the brand of the vehicles that may have known deficiencies and existing defects of the vehicles; and (iv) collects the communication data and the outcome of the communication continuously to determine the accurate terminologies and signals used during the communications.

Figure 4:
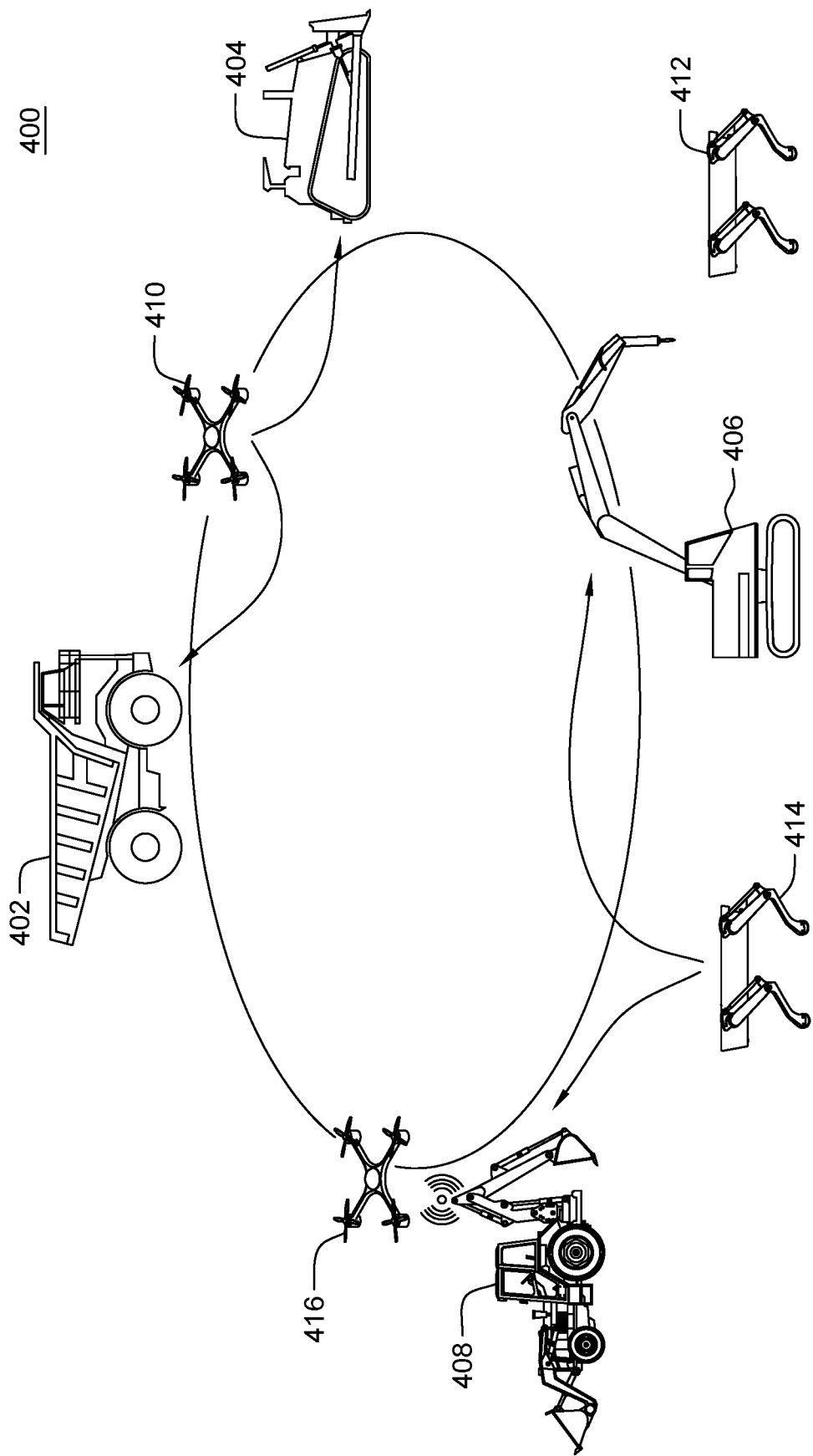
FIG. 4 is a context diagram showing information that is helpful in understanding embodiments of the present invention.

Diagram 400 of FIG. 4 is a context diagram showing how various machines communicate with the data transfer vehicles. Diagram 400 includes the following components: machine 402, machine 404, machine 406, machine 408, data transfer vehicle 410, data transfer vehicle 412, data transfer vehicle 414, and data transfer vehicle 416.

Diagram 400 further shows that the data transfer vehicles will receive data from one machine and send that same data to another machine using a physical vehicle (such as a drone or a spot robot). In one embodiment, data transfer vehicle 410 (which can be a drone) is shown as moving in the surrounding environment in order to better determine the need to transfer data. In one embodiment, machine 402 and machine 406 are shown as being sufficiently far away from one another such that these two machines are outside of their wireless communication range. In this instance, data transfer vehicle 410, 412, 414 and/or 416 can be used to transfer encrypted data from machine 402 to machine 406. Additionally, in one embodiment, it is shown that data transfer vehicle 416 is transferring encrypted data received from another machine (not shown) to machine 408.

In some embodiments of the present invention, machines 402, 404, 406 and 408 include mobile vehicles. However, in the embodiments where machines 402, 404, 406 and 408 are mobile vehicles, these machines are not to be considered "data transfer vehicles" for the purposes of this document. Additionally or alternatively, machines 402, 404, 406 and 408 are stationary computing system(s) (that is, computing system(s) that are not structured and configured to move, on its own, from a first location to a second location—such as an isolated computing system, a set of cloud computing servers, etc.).

It is important to note that the use of the term "machine" (as used throughout this document—such as machines 402, 404 and 408) is intended to be a conceptually separate term from the term "data transfer vehicle" (as used throughout this document—such as data transfer vehicles 410, 412, 414, and 416).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   providing a plurality of data transfer vehicles, with each data transfer vehicle of the plurality of data transfer vehicles being structured and configured to transfer encrypted data from a first machine to a second machine;
   positioning, in a proactive manner, the plurality of data transfer vehicles around the first machine and the second machine;
   determining that a first condition exists that prevents the first machine from performing a data transfer operation to the second machine, wherein the first condition is that the first machine is outside of a threshold near-field communication (NFC) range to communicate with the second machine;
   responsive to the determination that the first machine cannot perform the data transfer operation to the second machine, collecting, by a first data transfer vehicle, a set of encrypted data stored on the first machine; and
   transferring, by the first data transfer vehicle, the set of encrypted data stored on the first machine to the second machine.

2. The CIM of claim 1 wherein the first condition that prevents the first machine from performing a data transfer operation to the second machine is that a Wi-Fi capability of the first machine is compromised due to a poor network event.

3. The CIM of claim 1 wherein the proactive positioning of the plurality of data transfer vehicles is based, at least in part, upon an amount of data that needs to be transferred.

4. The CIM of claim 1 wherein the proactive positioning of the plurality of data transfer vehicles is based, at least in part, upon a time-sensitivity of the data transfer.

5. The CIM of claim 1 wherein the proactive positioning of the plurality of data transfer vehicles is based, at least in part, upon an availability of the data transfer vehicles.

6. A computer program product (CPP) comprising:
   a machine-readable storage device; and computer code stored on the machine-readable storage device, with the computer code including instructions and data for causing a processor(s) set to perform operations including the following:

providing a plurality of data transfer vehicles, with each data transfer vehicle of the plurality of data transfer vehicles being structured and configured to transfer encrypted data from a first machine to a second machine;

positioning, in a proactive manner, the plurality of data transfer vehicles around the first machine and the second machine;

determining that a first condition exists that prevents the first machine from performing a data transfer operation to the second machine, wherein the first condition is that the first machine is outside of a threshold near-field communication (NFC) range to communicate with the second machine;

responsive to the determination that the first machine cannot perform the data transfer operation to the second machine, collecting, by a first data transfer vehicle, a set of encrypted data stored on the first machine; and transferring, by the first data transfer vehicle, the set of encrypted data stored on the first machine to the second machine.

7. The CPP of claim 6 wherein the first condition that prevents the first machine from performing a data transfer operation to the second machine is that a Wi-Fi capability of the first machine is compromised due to a poor network event.

8. The CPP of claim 6 wherein the proactive positioning of the plurality of data transfer vehicles is based, at least in part, upon an amount of data that needs to be transferred.

9. The CPP of claim 6 wherein the proactive positioning of the plurality of data transfer vehicles is based, at least in part, upon a time-sensitivity of the data transfer.

10. The CPP of claim 6 wherein the proactive positioning of the plurality of data transfer vehicles is based, at least in part, upon an availability of the data transfer vehicles.

11. A computer system (CS) comprising:
a processor(s) set;
a machine-readable storage device; and
computer code stored on the machine-readable storage device, with the computer code including instructions and data for causing the processor(s) set to perform operations including the following:
providing a plurality of data transfer vehicles, with each data transfer vehicle of the plurality of data transfer vehicles being structured and configured to transfer encrypted data from a first machine to a second machine;

positioning, in a proactive manner, the plurality of data transfer vehicles around the first machine and the second machine;

determining that a first condition exists that prevents the first machine from performing a data transfer operation to the second machine, wherein the first condition is that the first machine is outside of a threshold near-field communication (NFC) range to communicate with the second machine;

responsive to the determination that the first machine cannot perform the data transfer operation to the second machine, collecting, by a first data transfer vehicle, a set of encrypted data stored on the first machine; and transferring, by the first data transfer vehicle, the set of encrypted data stored on the first machine to the second machine.

12. The CS of claim 11 wherein the first condition that prevents the first machine from performing a data transfer operation to the second machine is that a Wi-Fi capability of the first machine is compromised due to a poor network event.

13. The CS of claim 11 wherein the proactive positioning of the plurality of data transfer vehicles is based, at least in part, upon an amount of data that needs to be transferred.

14. The CS of claim 11 wherein the proactive positioning of the plurality of data transfer vehicles is based, at least in part, upon a time-sensitivity of the data transfer.

15. The CS of claim 11 wherein the proactive positioning of the plurality of data transfer vehicles is based, at least in part, upon an availability of the data transfer vehicles.

16. The CIM of claim 1 wherein the first condition that prevents the first machine from performing a data transfer operation to the second machine is that a network connectivity of the first machine is inoperable.

17. The CIM of claim 16, wherein the network connectivity is inoperable in a location of the first machine due to a natural disaster.

18. The CPP of claim 6 wherein the first condition that prevents the first machine from performing a data transfer operation to the second machine is that a network connectivity of the first machine is inoperable.

19. The CPP of claim 18, wherein the network connectivity is inoperable in a location of the first machine due to a natural disaster.

20. The CS of claim 11 wherein the first condition that prevents the first machine from performing a data transfer operation to the second machine is that a network connectivity of the first machine is inoperable in a location of the first machine due to a natural disaster.

* * * * *